Nov. 15, 1932.  L. R. BROWN  1,888,157
CALCULATING MACHINE
Filed April 15, 1930   5 Sheets-Sheet 1

Inventor
Lee R. Brown
by E. W. Anderson Son
Attorneys

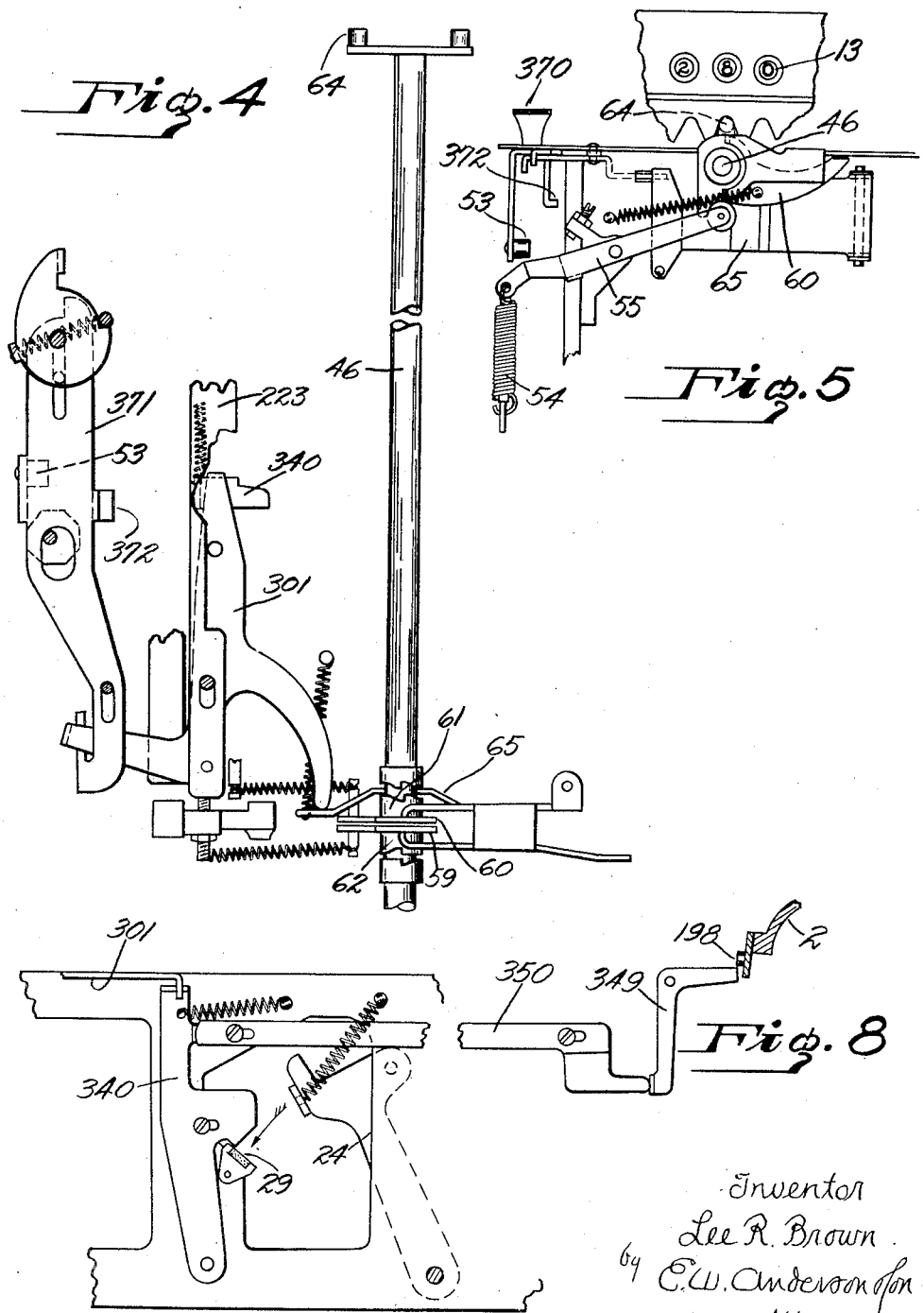

Nov. 15, 1932.    L. R. BROWN    1,888,157
CALCULATING MACHINE
Filed April 15, 1930    5 Sheets-Sheet 5
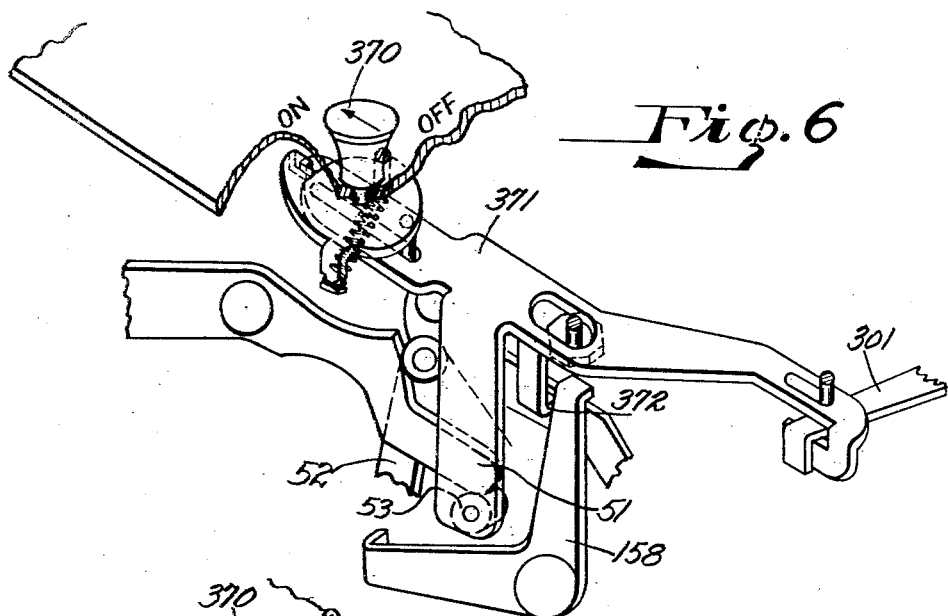
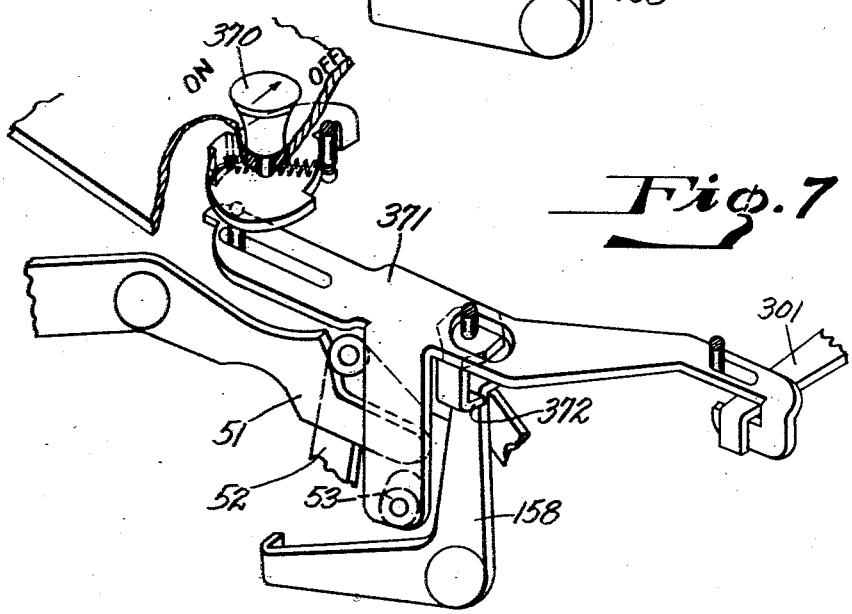
Inventor
Lee R. Brown.
by E. W. Anderson Jon
Attorneys Patented Nov. 15, 1932

1,888,157

UNITED STATES PATENT OFFICE

LEE R. BROWN, OF EAST ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed April 15, 1930. Serial No. 444,574.

The invention relates to mechanism for controlling the automatic shifting of the numeral wheel carriage of a calculating machine, and more particularly to means for changing the relation of the shift to the registering operations of the machine.

United States patent application Number 79,811, filed January 7, 1926, by George C. Chase, and entitled Automatic control for calculating machines, shows means for automatically shifting the numeral wheel carriage at the conclusion of a positive registration, such as the single corrective registration employed in the well-known method of securing automatic operation in division.

Patent No. 1,773,025, of the same inventor, patented Aug. 12, 1930, and entitled Carriage shift control for calculating machines, shows means for shifting automatically upon manual release of a positive operation motor key, or plus bar, together with means settable to allow operation of the bar without shifting.

The Chase Patent No. 1,773,026, patented Aug. 12, 1930, and entitled Carriage shift mechanism for calculators, shows means whereby, when the automatic shifting devices are set to active position, the carriage will be shifted at the conclusion of any registering operation, whether positive or negative. This entailed the employment of a different method of performing division from that contemplated in application Number 79,811, wherein the divisor, subtracted once too often from the dividend, was added in, to correct the registration before the carriage was shifted. According to Patent No. 1,773,026, however, the carriage would shift after the subtractive over-registration, and the correction would be made in connection with an additive calculation to determine the next lower order quotient figure.

All of the above noted methods of operation are utilized in the present invention, wherein the machine is settable to either of two conditions, determining, primarily, that an automatic shift shall occur either at the conclusion of positive registrations only, or that it shall occur at the conclusion of any registration, positive or negative.

The same setting may also govern the occurrence or non-occurrence of a shift upon release of the plus or minus bars.

The invention consists in the novel construction and combination of parts, as set forth in the appended claims.

In the accompanying drawings, illustrating the invention,

Fig. 4 is a detail plan view of the carriage shifting mechanism.

Fig. 5 is a detail front elevation of the carriage shifting mechanism, in operating position.

Fig. 6 is a perspective view of the adjusting devices and associated parts, shown in "on" position.

Fig. 7 is a similar view, showing the parts in "off" position.

Fig. 8 is a side elevation of the shift clutch latch and associated parts.

Figure 1:
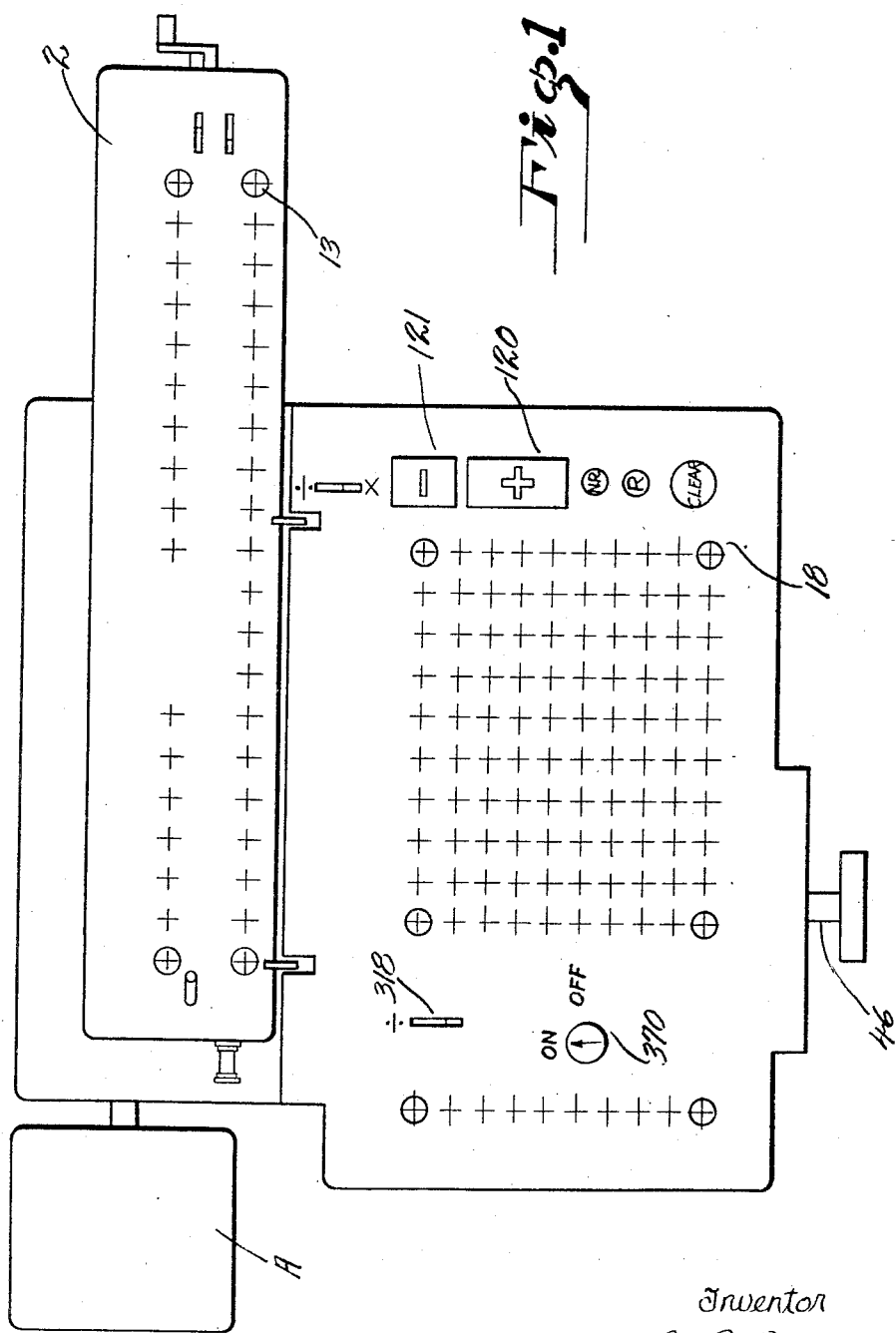
Figure 1 is a plan view of a calculating machine to which the invention has been applied.
Figure 2:
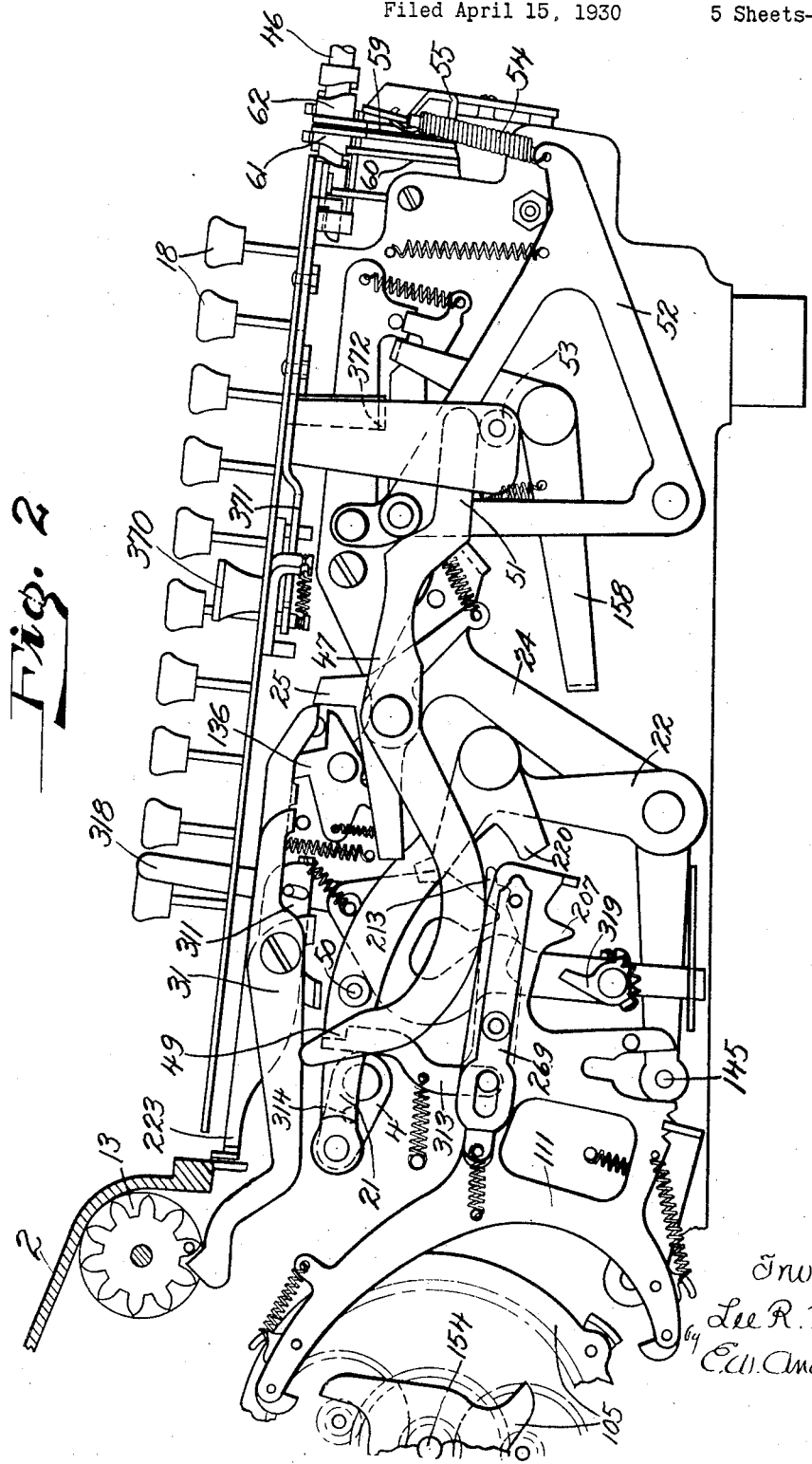
Fig. 2 is a left-hand elevation of the same, with the casing removed and with parts broken away.
Figure 3:
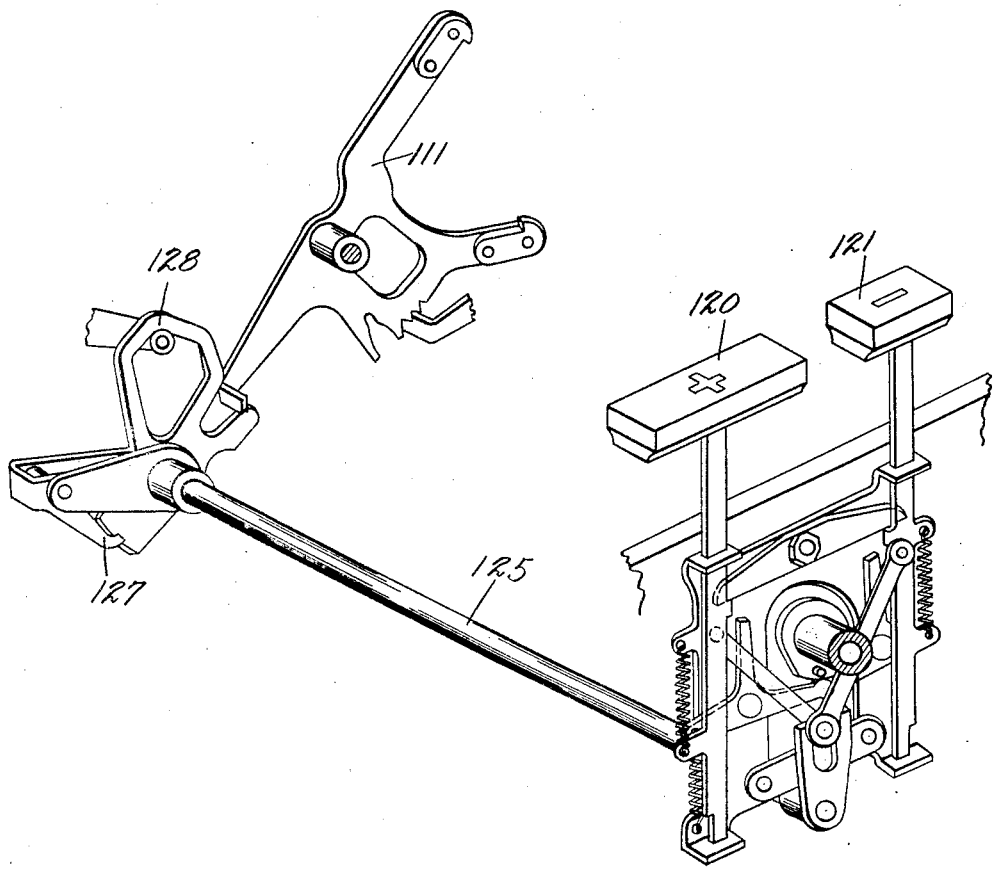
Fig. 3 is a perspective view of the plus and minus bar mechanism.

In these drawings the invention is shown as applied to the well-known Monroe calculating machine, such machine being shown in part in United States Patent Number 1,566,650, issued to George C. Chase on December 22, 1925, and being further equipped with automatic division mechanism.

In accordance with the disclosure of the above-noted patent, amounts set up on the keyboard 18 are registered upon numeral wheels 13 by the operation of differential gear shaft 4 and of shaft 154 whereon the tens carry members are mounted, these shafts being connected by suitable gearing. The numeral wheels 13, together with the usual multiplier and quotient wheels are mounted in a transversely shiftable carriage, employed in the well-known manner in performing operations in multiplication and in division.

An electric motor A has driving connection with a clutching and reversing transmission mechanism 105 of the planetary gear type, said mechanism being adjustable to transmit forward or reverse rotation to carry shaft 154, in accordance with the depression of a plus bar 120 or a minus bar 121. This is effected through the rocking in one or the other direction of a shaft 125, operable by said bars, a setting lever 128 and a reversing clutch lever 111, acting upon the planetary differential in known manner.

Movement of lever 128 upon depression of the plus or minus bar will also set a releasing pawl 136 in position to trip a trigger 31 upon release of such bar, so that at the end of the current cycle of operation the actuating mechanism of the machine will be brought to rest, as follows:

Trigger 31 being moved, will release the stop element 25, pivotally mounted upon stop arm 24, said element dropping into the path of movement of a rock arm 22, connected to shaft 4 by a link 21 and crank arm 20. Rock arm 22, picking up arm 24, will carry the same against a fixed stop 29 and will also lift a pin 145, mounted upon a rearward extension of arm 24 into engagement with a cam face of reversing clutch lever 111, to move the same to neutral or unclutching position.

It will be evident from the above that addition and subtraction are performed by a momentary depression of the plus and minus bars, respectively. Multiplication may be performed by holding down plus bar 120 until a number of cycles of operation have been made corresponding to a figure of the multiplier, numeral wheel carriage 2 being shifted and another figure calculated, etc. Obviously, multiplier keys may be employed for automatically determining the extent of each multiplier figure operation, by means well-known in the art and illustrated for instance in the reissue patent to Chase Number 17,466. In division, whether accomplished by the use of the plus and minus bars or by the automatic division lever, quotient figures may be automatically determined by the aid of devices operated upon by the overrun of the carry mechanism, as follows:

The divisor set up on keyboard 18 is subtracted from the dividend registered on numeral wheels 13 once more than the number of times said divisor is contained in the corresponding portion of the dividend, a negative numeral wheel reading resulting and the carry over mechanism operating the higher order wheels 13 as far to the left as such carry over mechanism is provided. This transitional carry will cause a pin on the wheel 13 associated at the time with the highest order carry mechanism to move trigger 31, operating the stopping devices above described. In operation by the minus bar, the machine will now be allowed to come to rest, notwithstanding continued depression of the key, by the tripping of coupling 127, described in Patent 1,566,650. Both the numeral wheels 13 and the quotient register will now show an incorrect registration, but, by an additive operation, either made in the same denominational order as the previous subtraction or in the next lower order and in connection with the calculation of the next quotient figure, a transitional carry will be obtained which will leave all registrations correct. Both of these methods of operation are well-known in the art, the one being the usual automatic arrangement of the Monroe machine and the other of the Mercedes.

When the automatic division lever 318 is used, the operation of the stopping mechanism will be modified, to provide for the reversal of the direction of rotation of the numeral wheel actuators; the automatic shifting of the carriage and the reengagement of the clutch.

To accomplish these results, the division lever 318 is provided with a pawl 319 which, when the lever is moved to operative position, contacts with a pin 207 on the reversing clutch lever 111 and throws the same into subtractive clutching position. At the same time, the division lever advances a sliding tooth 209 of lever 111, allowing a latch 213 to drop into engagement with tooth 209 to hold it in projected position. When reversing clutch lever 111 is thrown into neutral by the action of the stopping means, the tooth 209 will come into the path of movement of a tooth 220 of link 21, so that, as the parts rebound after the contact of arm 24 with stop 29, tooth 220 will throw lever 111 into clutch to reverse the operation.

Movement of division lever 318 into operative position also engages a carriage shifting clutch 61, so that subsequent operation of the stopping or reversing mechanism will operate to shift carriage 2 to the left, as follows:

Push rod 47 is pivoted intermediately upon arm 24, one end of said rod being provided with a cam 49 cooperating with a pin 50 of link 21. When arm 24 is carried against the stop, at the end of an additive operation, crank 20 will move downward from dead center position, and pin 50 will move toward cam 49, holding the other end of rod 47 against a roller mounted upon bell lever 52, so that movement of arm 24 will be transmitted to the bell lever and thereby, through connection 54, lever 55, cam 60 and clutch member 61 to carriage shifting shaft 46. A crank pin 64 of shaft 46, acting upon a serrated member of the carriage will effect the shifting.

At the end of a subtractive registration, however, pin 50 will move away from rod 47, and no shifting impulse will occur since said rod may now move below the roller of bell lever 52, except under the special conditions hereinafter described.

Thus, in dividing by the use of the lever 318, the operation will ordinarily be accomplished by the subtract, add, shift method.

In order, however, to adapt the machine for solving division problems automatically by the subtract, shift, add, shift method, and to attain an automatic shifting upon the release of the plus or the minus bar, the following mechanism is provided:

A bar 371, located beneath the keyboard plate is adjustable by means of a knob 370 and is provided at its rear end with an extension having a roller 53 adapted to be brought beneath a cam extension 51 of push rod 47. In this position of the parts, push rod 47 will be held constantly in engagement with the roller of bell lever 52, and each operation of arm 24 will accomplish a shift of carriage 2. In this adjustment of bar 371, also, a second extension of said bar will lie with its flange 372 in the path of movement of a lever 158, adapted for actuation by rock arm 22 during each rotation of the machine.

The forward end of bar 371 engages an arm of clutch shift lever 301, so that as the bar is operated by lever 158, a second arm of lever 301 moves a plate 65, engaging the clutch 62 with a member fast upon shifting shaft 46, in which position the parts will be held by latch 340. Clutch 62 has a cam 59, similar to cam 60 and also operated by lever 55. At the completion of an additive or a subtractive registration, movement of arm 24 will effect the shift, and said arm will then contact with and release latch 340.

When the numeral wheel carriage has been shifted to its extreme left-hand position, latch 340 will be held out of engaging position, by means of slide 350, bell lever 349 and a pin 198 on the carriage. Thus the shifting clutch will not be held in engaging position and no shifting impulse will be transmitted.

Movement of carriage 2 to extreme left-hand position will also place mechanism in position to return division lever 318 to neutral, this mechanism comprising a lever 223 adapted upon operation by the carriage pin 198 to depress the rear end of a push rod 311, against spring tension, so that said end will lie in the path of movement of a lever 313, reciprocated by a crank pin 314 of shaft 4. The forward end of push rod 311 is connected to division lever 318, so that upon rotation of pin 314 in additive or in subtractive direction (carriage 2 being in extreme left-hand position) lever 313 will return the division lever to inactive position.

I claim:

1. In a calculating machine having a transversely shiftable numeral wheel carriage, and means for registering additively or substractively upon the numeral wheels; a power train, a carriage shifting train, a connecting member between said trains, means selectively operable according to the nature of the registration to render the connecting member active at the conclusion of an additive registering operation only, and a member adjustable to render the connecting member active also at the conclusion of a subtractive registering operation.

2. In a calculating machine having a transversely shiftable numeral wheel carriage, and means for registering additively or subtractively upon the numeral wheels; a power train including a member timed to operate at the conclusion of each registering operation, a carriage shifting train, a link connected to a member of one of said trains and adapted for operative engagement with a member of the other train, means selectively operable according to the nature of the registration to engage the link with the train member at the conclusion of an additive registration operation only, and a member adjustable to hold the link constantly in engagement with the train member.

3. In a calculating machine having a transversely shiftable numeral wheel carriage, and means for registering additively or subtractively upon the numeral wheels, including single order operation control devices; automatic plural order operation means, including an operation control member, a power train, a carriage shifting train, a connecting member between said trains, means selectively operable according to the nature of the registration to render the connecting member active at the conclusion of an additive registering operation only, means adjustable by the plural order operation control member to enable and disable the carriage shifting train, and a member adjustable to render the connecting member active also at the conclusion of a substractive registering operation and to render the shift enabling means responsive to the single order operation control devices.

Signed at Orange in the county of Essex and State of New Jersey this 11th day of April A. D. 1930.

LEE R. BROWN.